United States Patent [19]
Chaddha

[11] Patent Number: 6,014,701
[45] Date of Patent: Jan. 11, 2000

[54] SELECTING A COST-EFFECTIVE BANDWIDTH FOR TRANSMITTING INFORMATION TO AN END USER IN A COMPUTER NETWORK

[75] Inventor: Navin Chaddha, Sunnyvale, Calif.

[73] Assignee: Microsoft Corporation, Redmond, Wash.

[21] Appl. No.: 08/887,754

[22] Filed: Jul. 3, 1997

[51] Int. Cl.[7] .................................................. G06F 13/00
[52] U.S. Cl. ........................... 709/226; 709/223; 709/238
[58] Field of Search ..................... 709/201, 202, 709/218, 217, 219, 223, 226, 238, 239, 240, 241, 224; 370/431, 468

[56] References Cited

U.S. PATENT DOCUMENTS

| | | | |
|---|---|---|---|
| 5,418,713 | 5/1995 | Allen | 705/32 |
| 5,446,919 | 8/1995 | Wilkins | 455/6.2 |
| 5,481,542 | 1/1996 | Logston et al. | 348/7 |
| 5,633,810 | 5/1997 | Mandal et al. | 370/431 |
| 5,671,225 | 9/1997 | Hooper et al. | 370/468 |
| 5,774,170 | 6/1998 | Hite et al. | 348/9 |

*Primary Examiner*—Viet D. Vu
*Attorney, Agent, or Firm*—Schwegman, Lundberg, Woessner & Kluth, P.A.

[57] ABSTRACT

A cost effective method for generating and delivering scalable multimedia content targeted at specific end user(s) via client computers coupled to servers by a diverse computer network which includes local area networks (LANs) and/or wide area networks (WANs) such as the internet. In one embodiment in which the server is billed for network bandwidth consumed, upon receiving an end user request for multimedia content, the server computes the likelihood of patronage. Indicators useful for estimating the likelihood of patronage include regularity of patronage, income history, credit worthiness, age, hobbies, occupation and marital status. A cost effective bandwidth is selected for delivering the requested content. Such an arrangement is advantageous because the content is delivered to end user at a bandwidth corresponding to the probability of consummating a sale.

20 Claims, 5 Drawing Sheets

SELECTING A COST-EFFECTIVE BANDWIDTH FOR TRANSMITTING INFORMATION TO AN END USER IN A COMPUTER NETWORK

BACKGROUND OF THE INVENTION

Field of the Invention

The present invention relates to the customization of information. More particularly, the present invention relates to the distribution of customized multimedia content over a network.

Related Applications

Pending U.S. patent application Ser. No. 08/818,804, entitled "Production of a Video Stream with synchronized Annotations over a Computer Network", is incorporated herein by reference in its entirety.

Description of the Related Art

With the proliferation of connections to the internet by a rapidly growing number of consumers, the viability of the internet as a widely accepted marketing channel using multimedia content has increased correspondingly. However, in a substantially dispersed marketplace, sending the same marketing content to all the consumers within the marketplace is not cost effective.

This is because consumers within the substantially dispersed marketplace may have diverse interests since their needs can vary greatly. Using a sporting goods example, a busy executive may only be interested in stationary exercise machines, while a retired engineer may be interested in rifles and camping equipment. Consumer needs also vary greatly depending on geographical location. Swimsuits are probably more popular in San Diego than in Anchorage. Conversely, snow mobiles are probably sell better in Alaska than in Arizona.

As such, efficient distribution of marketing information is needed to avoid wasting network resources. However, traditional methods of marketing generally involve mass marketing information to the consumers within the marketplace. This mass marketing model is unsatisfactory for large marketplaces wherein the consumers are more likely to have diverse interest.

In view of the foregoing, there are desired improved techniques for efficiently distributing marketing information over a computer network to consumers with diverse interest, while efficiently utilizing the network resources thereby providing consumers with information that is of interest to the individual consumer in a cost effective manner.

SUMMARY OF THE INVENTION

The present invention provides cost effective scalable multimedia content targeted at specific end user(s) via client computers coupled to servers by a diverse computer network which includes local area networks (LANs) and/or wide area networks (WANs) such as the internet. Multimedia content includes video/audio streams and textual and/or graphical information such as applets and HTML pages.

In one embodiment in which the server is billed for network bandwidth consumed, upon receiving an end user request for multimedia content, the server computes the likelihood of patronage. Indicators usefull for estimating the likelihood of patronage include regularity of patronage, income history, credit worthiness, age, hobbies, occupation and marital status. A cost effective bandwidth is selected for delivering the requested content. Such an arrangement is advantageous because the content is delivered to end user at a bandwidth corresponding to the probability of consummating a sale. These and other advantages of the present invention will become apparent upon reading the following detailed descriptions and studying the various figures of the drawings.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

Figure 1:
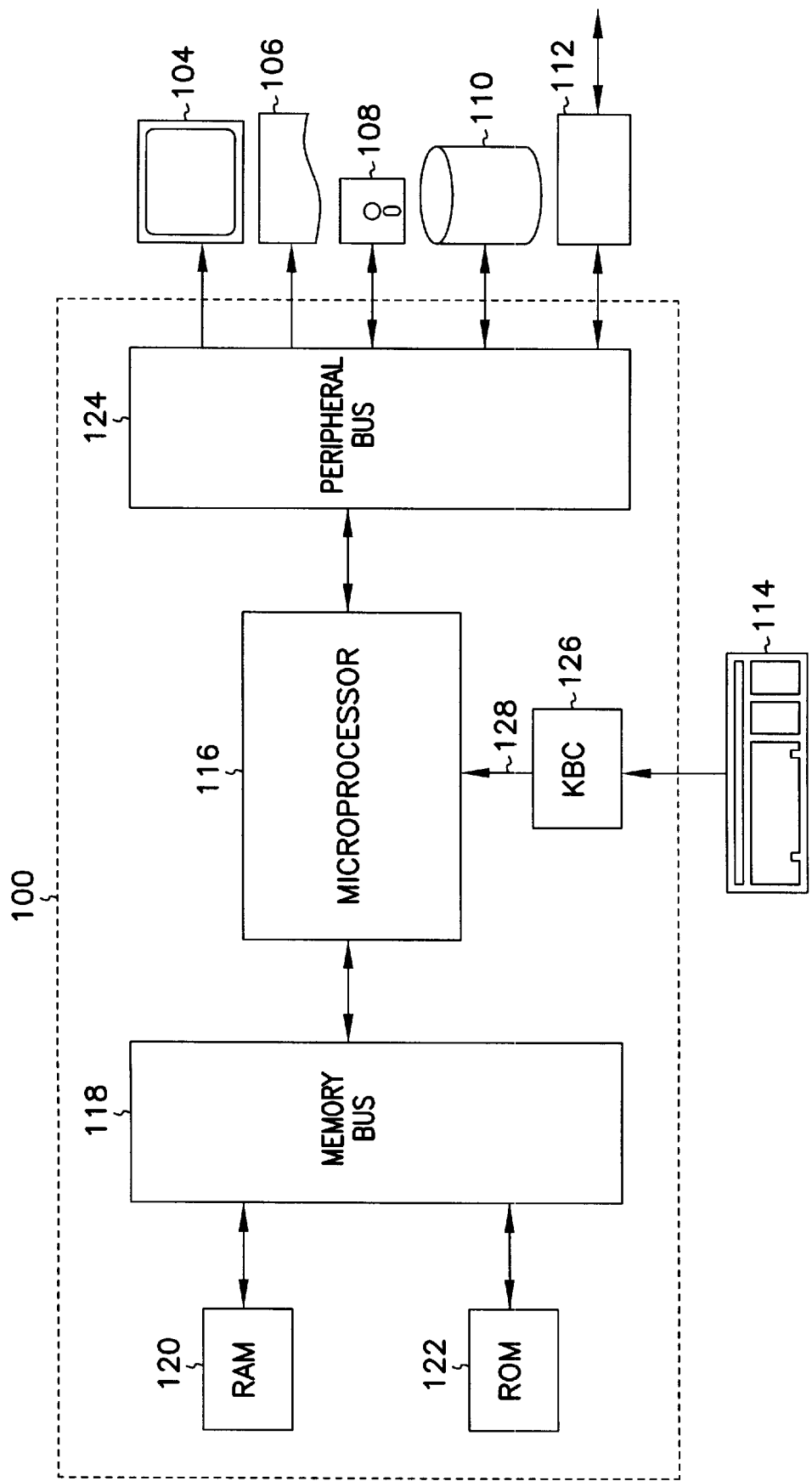
FIG. 1 is a block diagram of an exemplary computer system for practicing the various aspects of the present invention.

FIG. 1 is a block diagram of an exemplary computer system 100 for practicing the various aspects of the present invention. Computer system 100 includes a display screen (or monitor) 104, a printer 106, a floppy disk drive 108, a hard disk drive 110, a network interface 112, and a keyboard 114. Computer system 100 includes a microprocessor 116, a memory bus 118, random access memory (RAM) 120, read only memory (ROM) 122, a peripheral bus 124, and a keyboard controller 126. Computer system 100 can be a personal computer (such as an Apple computer, e.g., an Apple Macintosh, an IBM personal computer, or one of the compatibles thereof), a workstation computer (such as a Sun Microsystems or Hewlett-Packard workstation), or some other type of computer.

Microprocessor 116 is a general purpose digital processor which controls the operation of computer system 100. Microprocessor 116 can be a single-chip processor or can be implemented with multiple components. Using instructions retrieved from memory, microprocessor 116 controls the reception and manipulation of input data and the output and display of data on output devices.

Memory bus 118 is used by microprocessor 116 to access RAM 120 and ROM 122. RAM 120 is used by microprocessor 116 as a general storage area and as scratch-pad memory, and can also be used to store input data and processed data. ROM 122 can be used to store instructions or program code followed by microprocessor 116 as well as other data.

Peripheral bus 124 is used to access the input, output, and storage devices used by computer system 100. In the described embodiment(s), these devices include display screen 104, printer device 106, floppy disk drive 108, hard disk drive 110, and network interface 112. Keyboard controller 126 is used to receive input from keyboard 114 and send decoded symbols for each pressed key to microprocessor 116 over bus 128.

Display screen 104 is an output device that displays images of data provided by microprocessor 116 via peripheral bus 124 or provided by other components in computer system 100. Printer device 106 when operating as a printer provides an image on a sheet of paper or a similar surface. Other output devices such as a plotter, typesetter, etc. can be used in place of, or in addition to, printer device 106.

Floppy disk drive 108 and hard disk drive 110 can be used to store various types of data. Floppy disk drive 108 facilitates transporting such data to other computer systems, and hard disk drive 110 permits fast access to large amounts of stored data.

Microprocessor 116 together with an operating system operate to execute computer code and produce and use data. The computer code and data may reside on RAM 120, ROM 122, or hard disk drive 120. The computer code and data could also reside on a removable program medium and loaded or installed onto computer system 100 when needed. Removable program mediums include, for example, CD-ROM, PC-CARD, floppy disk and magnetic tape.

Network interface circuit 112 is used to send and receive data over a network connected to other computer systems. An interface card or similar device and appropriate software implemented by microprocessor 116 can be used to connect computer system 100 to an existing network and transfer data according to standard protocols.

Keyboard 114 is used by a user to input commands and other instructions to computer system 100. Other types of user input devices can also be used in conjunction with the present invention. For example, pointing devices such as a computer mouse, a track ball, a stylus, or a tablet can be used to manipulate a pointer on a screen of a general-purpose computer.

The present invention can also be embodied as computer readable code on a computer readable medium. The computer readable medium is any data storage device that can store data which can be thereafter be read by a computer system. Examples of the computer readable medium include read-only memory, random-access memory, magnetic data storage devices such as diskettes, and optical data storage devices such as CD-ROMs. The computer readable medium can also be distributed over a network coupled computer systems so that the computer readable code is stored and executed in a distributed fashion.

Figure 2:
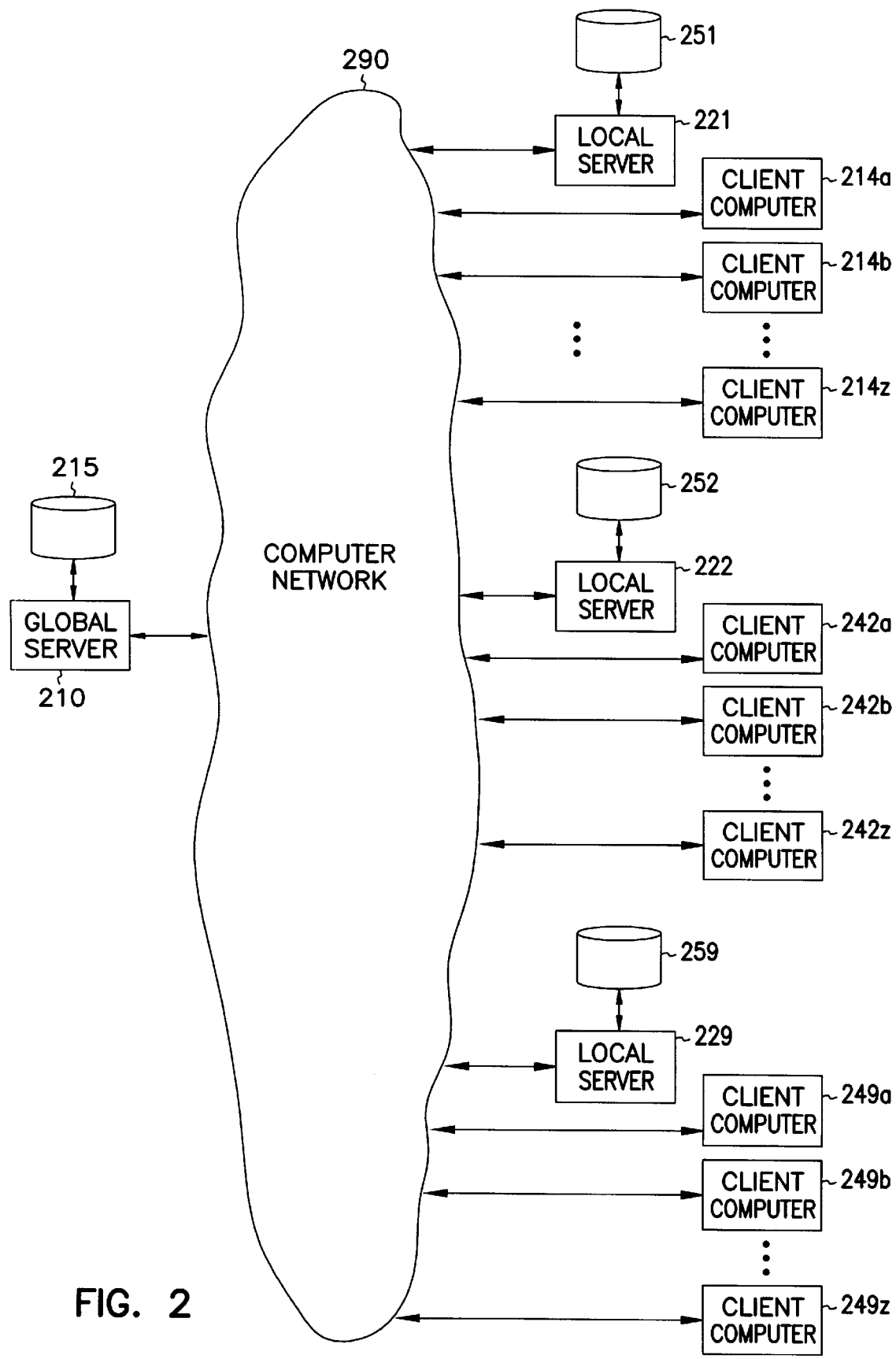
FIG. 2 is a block diagram showing an exemplary hardware environment for practicing the customizable information distribution (CID) system of the present invention.

FIG. 2 is a block diagram showing an exemplary hardware environment for practicing the customizable information distribution (CID) system of the present invention. The CID system includes a global server 210, a plurality of local servers 221, 222, . . . 229, and a plurality of client computers 241a, 241b, . . . 241z, 242a, 242b, . . . 242z, . . . 249a, 249b, . . . 249z, each of which can be implemented using the "general purpose" computer system 100 described above. Alternatively, client computers 241a, 241b, . . . 241z, 242a, 242b, . . . 242z, . . . 249a, 249b, . . . 249z may also be specialized microprocessor/microcontroller based systems, including television-based "set-top" boxes such as WebTV's boxes.

Global server 210 and local servers 221, 222,... 229 are coupled to client computers 241a, 241b, . . . 241z, 242a, 242b, . . . 242z, . . . 249a, 249b, . . . 249z, via a computer network 290, e.g., the internet. In addition, global server 210 is coupled to a global database 215, while local servers 221, 222, . . . 229 are coupled to local databases 251, 252, . . . 259, respectively. Note that the disclosed hardware environment is exemplary. For example, global database 215 may be coupled to global server 210 via network 290. Similarly, local servers 221, 222, . . . 229 may be coupled, via network 290, to local databases 251, 252, . . . 259, respectively.

In this embodiment, global server 210 is a stream server and provides video stream(s) and optional global annotation stream(s) to one or more of client computers 241a, 241b, . . . 241z, 242a, 242b, . . . 242z, . . . 249a, 249b, . . . 249z, ondemand. As described in the above cited U.S. patent application, Ser. No. 08/818,804, entitled "Production of a Video Stream with synchronized Annotations over a Computer Network", upon a request from a client computer, e.g., client computer 241a, encoded video/audio frames and any associated global annotation frames are streamed from global server 210 to client computer 241a for synchronous display. Streaming high content data such as video frames over network 290 is very efficient because streaming eliminates the need for a large buffer at client computer 241a. In addition, streaming also provides flexibility, e.g., switching video sources midstream is possible without wasting network resources since streaming is based on ajusting time (JIT) protocol and does not involve downloads of the entire video stream prior to display at client computer 241a. The encoded video/audio streams are then decoded by and displayed at client computer 241a.

Figure 3:
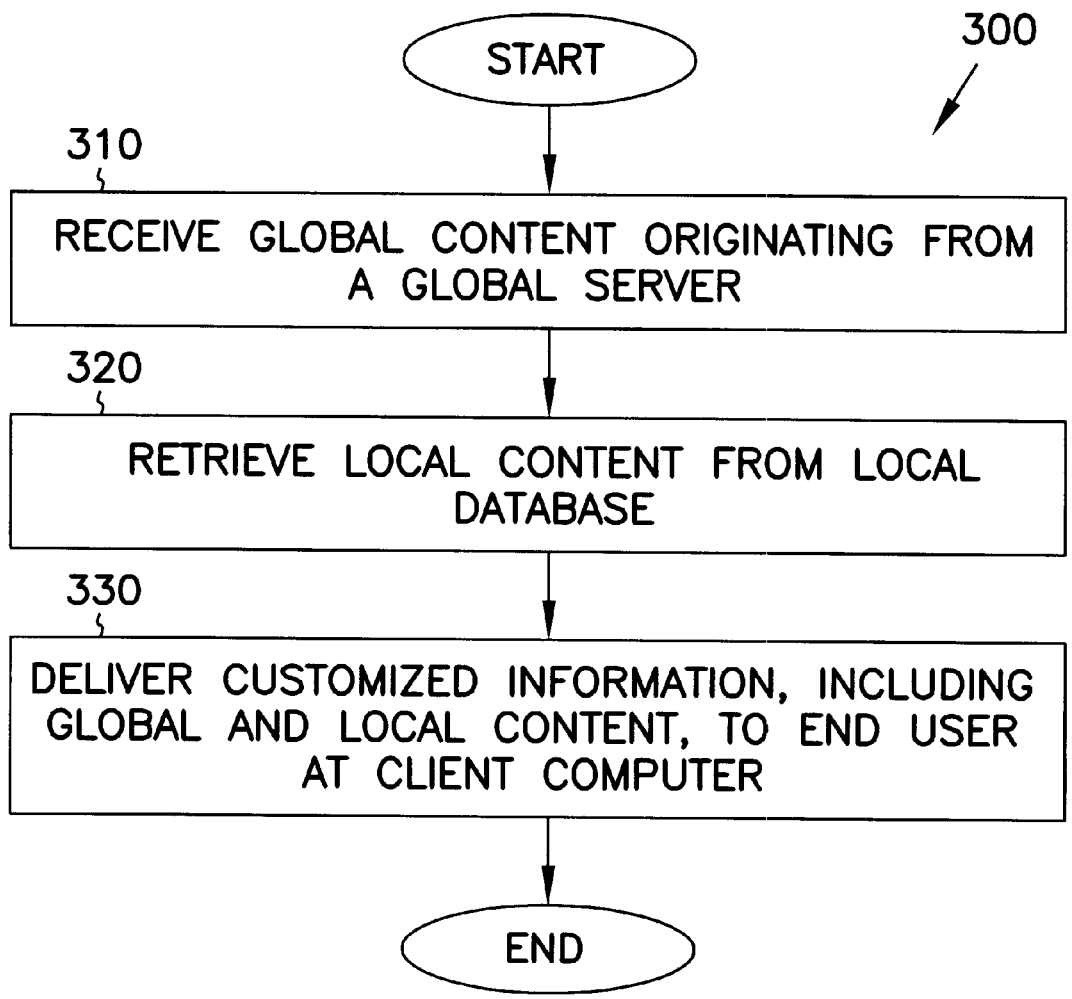
FIG. 3 is a flowchart illustrating the generation and delivery of localized content for end user(s) in accordance with the present invention.

In accordance with one aspect of the invention, as illustrated by the flowchart of FIG. 3, global content such as global video frames is streamed from global server 210 (step 310), while local content such as local annotations is retrieved from local server 221 (step 320). Local annotations can include banners, ticker tape, subtitles and/or animated graphics. In this example, synchronization of the global video frames and the local annotations is accomplished by sending control packets from global server 210 to local server 221. Such an arrangement permits customized information which includes both global content and customized local content to be delivered to groups of end users or for individual end users at client computers 241a, 241b, . . . 241z, 242a, 242b, . . . 242z, . . . 249a, 249b, . . . 249z (step 330).

In one implementation, local annotation frames for retrieving local content are streamed from local server 221. Annotation frames include event type and data type. In the case of a flipper frame, an event type, each flipper frame includes a HTML address and an event time marker. In the case of a ticker frame, a data type, each ticker frame includes ticker data and an event time marker. Note that an event time marker need not be identical to the time stamp of a corresponding video frame. Client computer 241a is capable of switching to a new displayable event together with a video frame or in between two video frames.

In this example, flipper annotation frames are provided synchronously with the video/audio frames to client computer 241a so that the annotations, i.e., displayable events, such as HTML pages, can be retrieved and synchronously displayed at client computer 241a. Accordingly, URL addresses, for synchronizing HTML page flips with video stream are provided to client computer 241a for subsequently retrieval and display of various textual and graphical elements updated at predetermined points corresponding to the timeline of the video stream. Note that HTML pages can be retrieved from either local server 221, a neighboring local server, e.g., local server 222, or other web server(s) (not shown) via network 290. The HTML pages include localized graphical information accompanying the video stream, such as handouts in a distant learning example.

In the case of ticker annotation frames, a data event type, ticker frames are provided by local server 221 synchronously with the video/audio frames so that the annotations, i.e., displayable ticker data can be synchronized for display at client computer 241a at predetermined points corresponding to the timeline of the video stream. Ticker data include localized textual data, such as subtitles of a movie in the local language.

Hence, the customized information delivered to the end user is a combination of global content, e.g., a global video movie, and local content, e.g., local language subtitles. Note that the above description of storing global and/or local information is only exemplary. Information can be distributed and stored in one or more physical locations. For example, global content may be cached at local server 221 or at an intermediate/regional server (not shown) located somewhere between global server 210 and local server 221. In addition, local database 251 may be a separate structure coupled to local server 221 as shown in FIG. 2, or local database 251 may be part of local server 221.

In the example described, the global content and the local content are related, e.g., a global video stream and local subtitles. However, the invention is equally useful for applications where the local content is unrelated to the global content. For example, in a marketing context, the local content may be HTML pages of localized graphical advertisements generated using Java applets and unrelated to the video stream. Such advertisements may be paid for by the sponsors of the video stream. For example, a global video stream of the Superbowl game may be accompanied by advertisements for sporting goods, health drinks or any other product. Depending on the browser, the end user at client computer 241a may not have the choice of disabling the advertisements.

Hybrids of the above described embodiment are also possible. In yet another embodiment, global annotation frames are streamed from global server 210. The global annotation frames include common directory information and file names. In this example, the respective local servers store the corresponding local content under a similar directory structure. As a result, the common directory information and file names can be used by client computers 241a, 241b, ... 241z, 242a, 242b, ... 242z, ... 249a, 249b, ... 249z. Upon receipt of the global annotation frames from global server 210, client computer 241a appends the network address of a pre-assigned local server, e.g., local server 221, and then proceeds with the retrieval of local content from the pre-assigned server.

Besides annotation frames, other schemes for providing localized or customized information are possible. For example, the end user may send a request for marketing information to global server 210, via, for example, a web browser (note shown) executing on client computer 241a. In accordance with a predetermined redirection plan, global server 210 forwards the request to the appropriate local server, e.g., local server 221. Subsequently, local server 221 provides local marketing content together with global content from global server 210 to client computer 241a for display via the web browser. Alternatively, the end user at client computer 241a may request marketing information from local server 221 which retrieves global content from global server 210, and then provides both global and local content to the end user.

Other combinations are also possible. For example, the video stream can be an online news program. Accordingly, global content includes a world news portion and a national news portion streamed to client computers 241a, 241b, ... 241z, 242a, 242b, ... 242z, ... 249a, 249b, ... 249z. The accompanying local content, e.g., subtitles for the hearing impaired, can either be global, regional or localized to suit the targeted end users. Local content can also include a local news portion is streamed to a subset of client computers, e.g., client computers 241a, 241b, ... 241z.

In accordance with another aspect of the invention, a variety of criteria is employed to subdivide client computers 241a, 241b, ... 241z, 242a, 242b, ... 242z, ... 249a, 249b, ... 249z. For example, global server 210 may serve a substantial geographical area, such as Canada, U.S.A., or the Latin American countries. As such, while client computers 241a, 241b, ... 241z, 242a, 242b, ... 242z, ... 249a, 249b, ... 249z from diverse areas, may be interested in the same video stream, client computers may prefer different local content. For example, viewers in Ontario may prefer HTML pages in English while viewers in Quebec may prefer HTML pages in French.

The present invention can be adapted to support a wide range in the total number of end users. Hence, where the marketplace supported by global server 210 is substantially large, it is also possible to divide the marketplace into several levels of servers. For example, in a three-level model, there will be global server(s), regional servers and local servers providing global content, regional content and local content, respectively.

In the marketing context, exemplary criteria for dividing the marketplace includes geography, climate, demography or national boundaries or combinations of thereof. For example, a division by latitude results in northern and southern states. A division by time zones results in the division of eastern and western states. A division by population density, appropriate for products such as lawn mowers, results in the division of big cities such as New York City and urban/rural areas where residents are more likely to have backyards with lawns.

Figure 4:
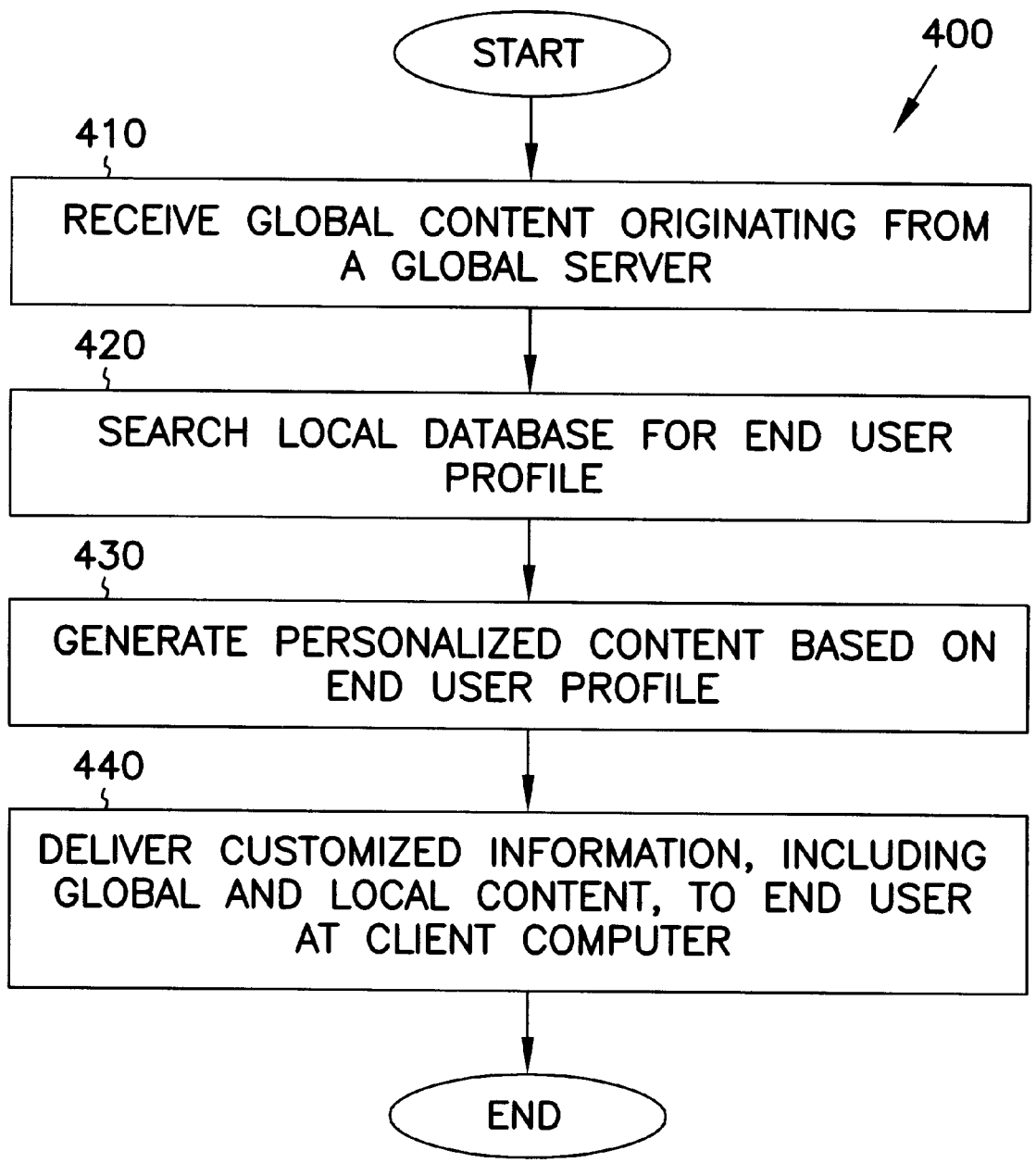
FIG. 4 is a flowchart illustrating the generation and delivery of personalized content for end user(s) in accordance with another aspect of the invention.

In accordance with another aspect of the invention, as illustrated by the flowchart of FIG. 4, in addition to receiving global content originating from global server 210 (step 410), local servers 221, 222, ... 229 retrieve personal information such as personal profiles stored in local databases 251, 252, 259 about end users associated with client computers 241a, 241b, ... 241z, 242a, 242b, ... 242z, ... 249a, 249b, ... 249z (step 420). Alternatively, local databases 251, 252, ... 259 do not store the profiles but include pointers for retrieving the profiles from other databases or web servers (not shown) when the need arises.

From the marketing perspective, personal information such as family income, hobbies and ages, provide usefull indicators of the consumption habits of the end users. For example, an avid outdoorsman is a likely consumer of tents, sleeping bags, freeze dried food, and perhaps hunting rifles. Similarly, a wealthy family is more likely to purchase an expensive European sports sedan. Accordingly, the personal information can be used by local servers 221, 222, ... 229 to generate personalized content which has a high likelihood of generating sale orders from the end users at client computers 241a, 241b, ... 241z, 242a, 242b, ... 242z, ... 249a, 249b, ... 249z (step 430). Next, customized information which includes both global content and personalized content is delivered to the end user(s) (step 440).

Figure 5:
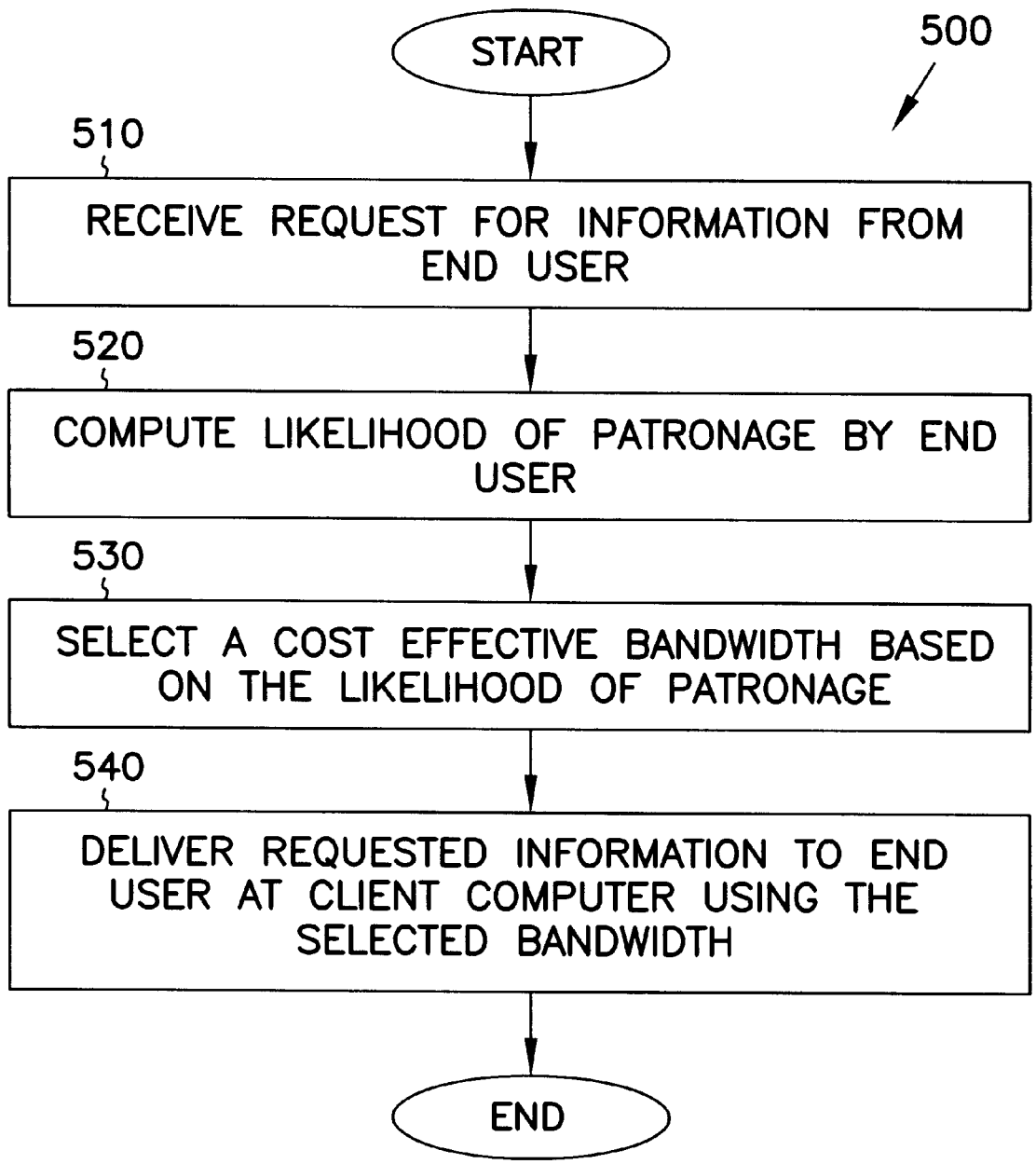
FIG. 5 is a flowchart illustrating the selection of cost effective bandwidth for delivering scalable multimedia content to end user(s) in accordance with yet another aspect of the invention.

FIG. 5 illustrates yet another aspect of the invention in which a cost effective bandwidth is selected for transmitting scalable multimedia content to the end user which corresponds to the likelihood of patronage. In this example, as in most wide area networks such as the internet, the content provider, e.g., advertiser, is billed for bandwidth used to disseminate the multimedia content. As such, in order to spent the marketing budget wisely, a cost effective scheme for selecting an appropriate bandwidth to deliver content is needed.

Upon receiving an optional end user request for the scalable multimedia content (step 510), a cost effective bandwidth is selected for transmitting the scalable content to the end user which corresponds to the likelihood of patronage (step 530). In this example, the scalable content is stored in a server, e.g., local server 221. Examples of scalable content include a scalable video stream or as a plurality of video streams corresponding different data transmission rates.

Indicators useful for estimating the likelihood of patronage, which indicates a likely return on the marketing investment, include regularity of patronage at the business, customers' income history, credit worthiness, age, hobbies, occupation and marital status (step 520). For example, if a request for a Rolls Royce came from an end user with an annual income of over a million dollars, the Rolls Royce dealer will likely transmit the sales information in the best resolution possible for the highest available bandwidth. Conversely, if the same request came from a twelve year old automobile buff with a very small expendable allowance, selecting the lowest bandwidth would be appropriate.

Note that other non end user specific factors may also be used to select an appropriate transmission bandwidth. For example, the overall demand/cost for the bandwidth at the time of the request or the time of day may be factors. Thus, end user indicators and non end user factors are used to select a cost effective bandwidth which is then used to deliver multimedia content to the end user (step 540). Although the above described example is based on a "pull" model, i.e., the multimedia content is delivered to the end user upon a request, the invention is equally applicable to unsolicited multimedia content.

Hence, in yet another embodiment, although more intrusive from the end user perspective, a "push" model of providing unsolicited localized marketing content may also be implemented. For example, instead of client computer 241a fetching an HTML page, an area of the web browser (or equivalent) executing on client computer 241a may be reserved for displaying localized marketing content that the end user does not have control over. Generally, if the global content is interesting enough, most end users have a level of tolerance for unsolicited marketing information. Commercial television have exploited this tolerance by inserting paid short commercials within popular television programs.

The different aspects of the present invention described above may be practiced with network performance improvement techniques such as multi-castiff and/or recasting. For example, pending U.S. patent application, Ser. No. 08/865,788, filed May 30, 1997, entitled "Method and Apparatus for Distributed Transmission of Real Time Multimedia Information", by Navin Chaddha et al, discloses a recasting server which pushes multiple bandwidth points and indexes in parallel with secondary servers, capable of dynamically switching bandwidth during transmission.

While this invention has been described in terms of several preferred embodiments, there are alterations, permutations, and equivalents which fall within the scope of this invention. For example, instead of distributing the regional/local content among regional/local servers, it is also possible to store regional/local content at the global server, to be selectively delivered to the appropriate end user(s). It is therefore intended that the following appended claims be interpreted as including all such alterations, permutations, and equivalents as fall within the true spirit and scope of the present invention.

What is claimed is:

1. In a server having a processor and memory, a method for delivering scalable multimedia content to be displayed on a display device of a client computer for an end user, the server and the client computer coupled to a computer network, the method comprising:

computing a probability of consummating a sale by said end user using at least one indicator associated with said end user which is stored in a database coupled to said server;

selecting a cost effective bandwidth from a plurality of bandwidths for the scalable multimedia content corresponding to the probability of consummating a sale; and delivering the multimedia content to the end user using the selected cost effective bandwidth.

2. The method of claim 1 further comprising receiving a request for the multimedia content from said end user.

3. The method of claim 1 wherein the multimedia content includes a video stream.

4. The method of claim 1 wherein computing the probability of consummating a sale uses at least one of a plurality of indicators such as past patronage, income, credit worthiness, age, hobbies, occupation and marital status.

5. The method of claim 4 wherein selecting the cost effective bandwidth also uses non end user factors such as demand for the bandwidth or the time of day.

6. A server having a processor and memory, the server configured to:

compute a probability of consummating a sale by an end user using at least one indicator associated with said end user which is stored in a database coupled to the server;

select a cost effective bandwidth for multimedia content from a plurality of bandwidths, wherein the cost effective bandwidth corresponds to the probability of consummating a sale; and deliver the multimedia content to the end user using the selected cost effective bandwidth.

7. The server of claim 6 further configured to receive a request for the multimedia content from said end user.

8. The server of claim 6 wherein the multimedia content includes a video stream.

9. The server of claim 6 wherein the probability of consummating a sale is computed using at least one of a plurality of indicators such as past patronage, income, credit worthiness, age, hobbies, occupation and marital status.

10. The server of claim 9 wherein the cost effective bandwidth is selected using non end user factors such as demand for the bandwidth or the time of day.

11. In a client computer having a processor, memory and a display device, a method of providing scalable multimedia content to an end user from a server, the server and the client computer coupled to a computer network, the method comprising:

receiving multimedia content from the server, the multimedia content delivered at a cost effective bandwidth selected from a plurality of bandwidths, the cost effective bandwidth corresponds to a probability of consummating a sale by the end user, the probability of consummating a sale by said end user computed using at least one indicator associated with said end user which is stored in a database coupled to said server; and displaying the multimedia content on said display device.

12. The method of claim 11 further comprising sending a request for the multimedia content to said server.

13. The method of claim 11 wherein the multimedia content includes a video stream.

14. The method of claim 11 wherein the probability of consummating a sale is computed using at least one of a plurality of indicators such as past patronage, income, credit worthiness, age, hobbies, occupation and marital status.

15. The method of claim 14 wherein the cost effective bandwidth is computed using non end user factors such as demand for the bandwidth or the time of day.

16. A client computer having a processor, memory and a display device, the client computer configured to:

receive multimedia content from a server, the server and the client computer coupled a computer network, the multimedia content delivered at a cost effective bandwidth selected from a plurality of bandwidths based on a probability of consummating a sale by the end user, the probability of consummating a sale by said end user computed using at least one indicator associated with said end user which is stored in a database coupled to said server; and display the multimedia content on said display device.

17. The client computer of claim 16 further configured to send a request for the multimedia content to said server.

18. The client computer of claim 16 wherein the multimedia content includes a video stream.

19. The client computer of claim 16 wherein the probability of consummating a sale is computed using at least one of a plurality of indicators such as past patronage, income, credit worthiness, age, hobbies, occupation and marital status.

20. The client computer of claim 16 wherein the cost effective bandwidth is computed using non end user factors such as demand for the bandwidth or the time of day.

\* \* \* \* \*